Aug. 12, 1969
W. KASTEN
3,460,676
UNITARY WATER SEPARATOR AND FUEL MONITORING ELEMENT
Filed Aug. 17, 1967
2 Sheets-Sheet 2
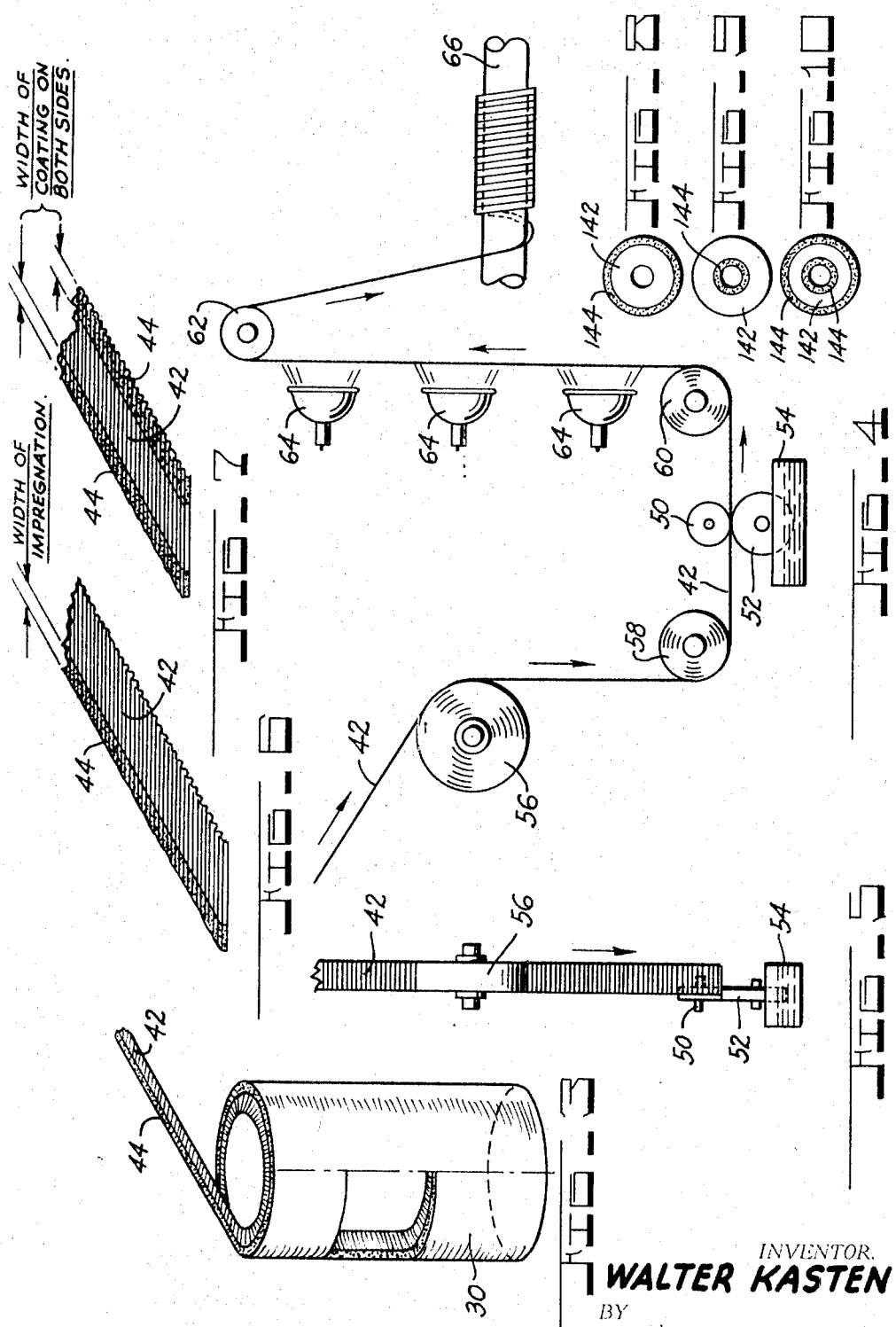
INVENTOR.
WALTER KASTEN.
BY
William N. Antonis
ATTORNEY.

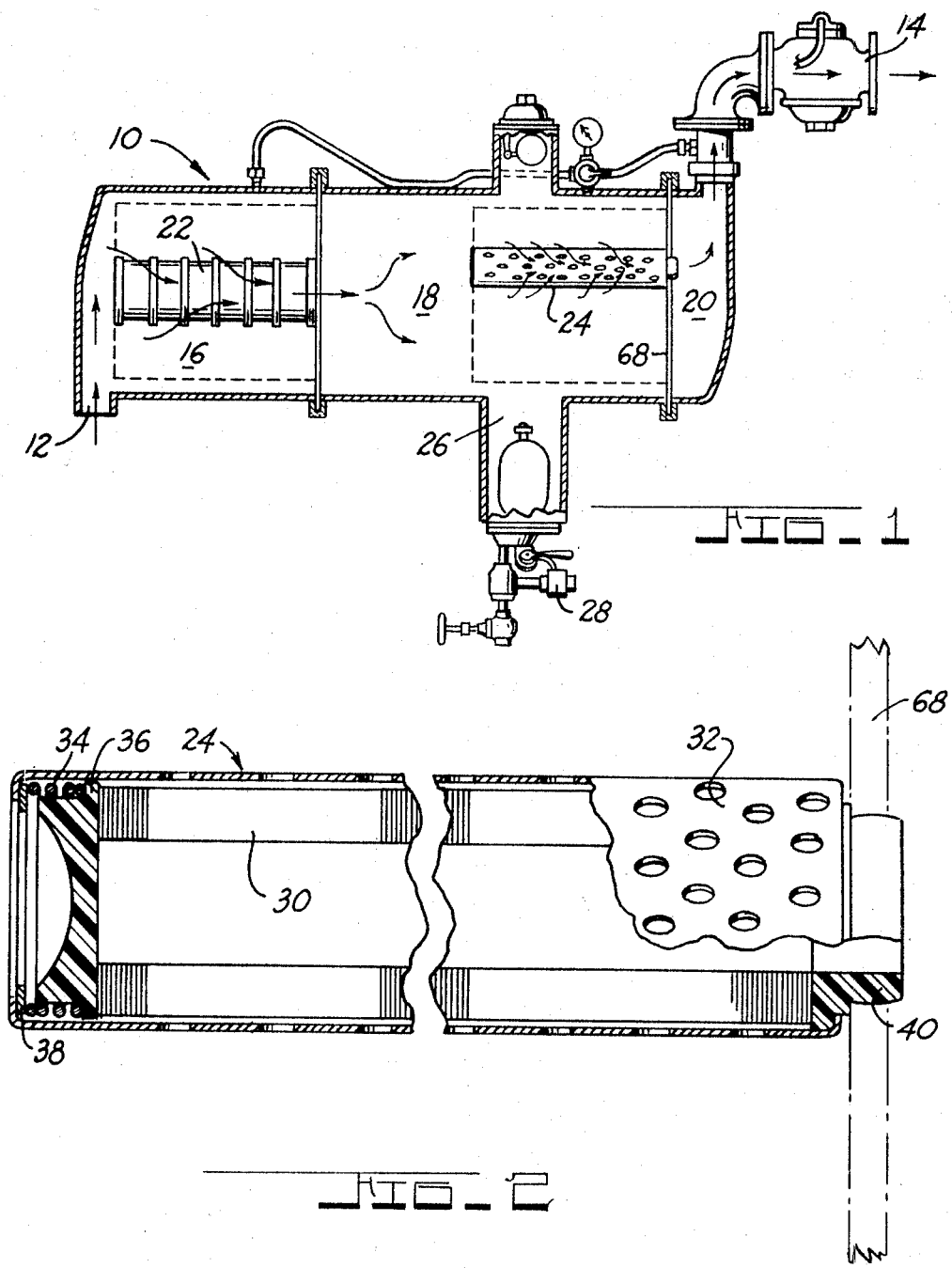

United States Patent Office 3,460,676
Patented Aug. 12, 1969

3,460,676
UNITARY WATER SEPARATOR AND FUEL MONITORING ELEMENT
Walter Kasten, Madison Heights, Mich., assignor to The Bendix Corporation, a corporation of Delaware
Filed Aug. 17, 1967, Ser. No. 661,347
Int. Cl. B01d 35/02, 29/10
U.S. Cl. 210—96                    7 Claims

ABSTRACT OF THE DISCLOSURE

The following relates to a unitary porous tubular member for use in a fuel monitoring element or fuse. The tubular member is formed from a plurality of registered face-to-face contacting layers of material having a hydrophobic upstream portion for preventing water droplets from flowing through the pores which extend radially between the layers and a hygroscopic downstream portion for absorbing any water which passes through the hydrophobic upstream portion. The layers of the tubular member can be formed of a plurality of axially aligned convolutions of ribbon material or of a plurality of stacked washers.

Background of the invention

Current practice for dispensing fuel into aircraft normally includes the steps of passing the fuel through a fuel filter water separator unit and then through a fuel monitoring unit, or alternatively, through a combination fuel filter water separator/monitoring unit, such as those shown in my U.S. Patent No. 3,182,800 or U.S. Patent No. 3,283,477.

In both of the foregoing instances the fuel to be cleaned and monitored passes through three separate elements in the following sequence. First, the fuel flows through a coalescer element which retains all harmful solid contaminants contained in the fuel. At the same time any free water which is contained in the fuel is coalesced into relatively large droplets as the fuel passes through the coalescer element. Most of these water droplets will settle into the sump of the unit. The fuel then passes through a separator element. This element is normally a fine mesh screen or a pleated paper element, the surface of which is rendered hydrophobic. Any of the water droplets which have not settled to the sump and are carried along with the fuel stream are prevented from passing through the separator element because of its hydrophobic characteristics. After passing through the separator element, the fuel then passes through a fuel monitoring or fuse element. The purpose and a detailed description of a commercially acceptable fuel monitoring element can be found in my previously issued patents, such as U.S. Patent No. 3,117,925 and U.S. Patent No. 3,151,071.

Summary of the invention

In view of the foregoing it is an object of this invention to provide a unitary porous element which combines the functions of a separator element and a fuel monitoring element.

Another object of this invention is to provide a unitary water separator and fuel monitoring element of the foregoing type which is more economical to manufacture than the two separate elements.

A further object of this invention is to provide a unitary porous separator element for use in a fuel filter water separator device which prevents flow of coalesced water droplets therethrough and absorbs any non-coalesced water passing therethrough, said porous element being sufficiently sensitive to predetermined levels of water contaminants flowing therethrough to cause closure of the pores therein and prevent flow of water-contaminated fuel therethrough.

More specifically, it is an object of this invention to provide a porous water separator and fuel monitoring element of the type described comprising registered face-to-face contacting layers of an uneven surface material which form a unitary tubular member having substantially radial pores extending between the layers for permitting flow of fuel therethrough, said layers being characterized by having a hydrophobic upstream portion for preventing water droplets from flowing through the pores and a hygroscopic downstream portion for absorbing any water which passes through the hydrophobic upstream portion and comes in contact therewith, said hygroscopic portion being capable of swelling upon contact with water and closing off said pores to thereby prevent further flow therethrough.

The above and other objects and features of this invention will become apparent from the following description taken in connection with the accompanying drawings.

Brief description of the drawings

FIGURE 1 is a view partially in section of a fuel filter water separator device incorporating the invention;

FIGURE 2 is an enlarged view, partially in section and partially broken away, of one of the unitary water separator and fuel monitoring elements shown in FIGURE 1;

FIGURE 3 is a perspective view of the element shown in FIGURE 2 with a portion thereof cut out and a portion thereof unwound for clarity;

FIGURES 4 and 5 diagrammatically illustrate the method of coating, drying and winding the ribbon material to form an element incorporating the invention;

FIGURE 6 is an enlarged exaggerated view of a portion of hydroscopic ribbon material utilized to fabricate the element wherein only an upstream portion thereof is suitably impregnated or coated with a hydrophobic substance;

FIGURE 7 is a view similar to that of FIGURE 6 wherein upstream and downstream portions of the hygroscopic ribbon material are rendered hydrophobic by coating with a suitable substance; and FIGURES 8, 9, and 10 show similar hydrophobic impregnation patterns for washers which can be utilized instead of ribbon material to fabricate a unitary water separator and fuel monitoring element of the type described.

Description of the preferred embodiments

Referring to FIGURE 1 is will be seen that numeral 10 indicates a fuel filter water separator device which includes an inlet port 12, an outlet port 14, and three chambers 16, 18, and 20. Interposed between chambers 16 and 18 are a plurality of coalescer elements 22 (only one of which is shown). A plurality of unitary water separator and fuel monitoring elements 24 (only one of which is shown) are interposed between chambers 18 and 20. The coalescer elements 22 may include resin bonded densely compressed layers of fine glass fibers and other filter media, or any suitable combination of materials capable of normally retaining solid contamination down to a fraction of a micron and coalescing emulsified fuel water mixtures into relatively large droplets of water and clean fuel. Most of these large droplets of water sink to the water sump 26 and also carry with them traces of extremely fine solids. Both the water and the very fine solids are discharged through a float-controlled water drain valve 28. Before reaching the outlet port 14 the fuel passes through elements 24 which prevent the passage of any water droplets and solid contaminants which may have reached these elements. In addition to the water separating function performed by other conventional separator elements, these particular elements are constructed in such a manner that they also function as fuel monitoring elements which can absorb water which for some reason or other was not separated from the fuel, and can prevent further flow therethrough at some predetermined contamination level.

More specifically each element 24 includes a porous tubular member 30 formed of registered face-to-face contacting layers of an uneven surface material having substantially radially extending pores located between the layers for permitting fluid flow therethrough. This tubular member 30 can be a ribbon-wound element or a washer-type element, the novel details of which will be hereinafter set forth. The porous tubular member 30 is located within a perforated housing 32 and is placed under a calibrated precompression by a spring 34. The spring is located within the perforated housing and abuts a movable endplate 36 and a washer 38, said endplate being in contact with one end of the porous tubular member 30. A ferrule 40 is suitably attached to the other end of the perforated housing and abuts the other end of the porous tubular member 30.

The porous tubular member 30, shown in FIGURE 3, is of the ribbon type and consists of a tubular porous member formed of a plurality of axially aligned convolutions of ribbon material in registered face-to-face contact. In other words, the tubular porous member is formed by winding ribbon material edgewise, as disclosed and claimed in my U.S. Patent No. 2,421,704. The ribbon 42 is a strip of crepe paper which is impregnated or otherwise treated with a hydrophobic adhesive 44 along the portion thereof which will constitute the upstream side of the element. It should be noted that the adhesive, which may be a suitable resin, is not present over the full width of the ribbon, but only covers a fraction of the total width, as shown more clearly in FIGURE 5. The percentage of the ribbon width which is treated with the hydrophobic substance depends on the desired sensitivity to water. For example, if it is desired to have an element which is rather insensitive to small quantities of water, then 70–80% of the ribbon width is coated or impregnated. If on the other hand, it is desired to have an element which is very sensitive to small amounts of water passing through it, then only about 20–30% of the ribbon is coated or impregnated.

To produce an element of the type described, crepe paper is slit into narrow ribbons (about 1/8" or 1/2" wide) with the crepe lines transverse to the length of the ribbon. The narrow strips are then wound onto reels for further processing. The coating or impregnation can be accomplished just prior to winding the ribbons edgewise into cylinders, or as a separate operation. When done concurrently with the winding, coating or impregnation can be accomplished by passing the ribbon strip 42 between a squeeze roller 50 and a coating roller 52 which is partially immersed in a tank 54 containing a hydrophobic substance. Other suitably positioned rollers such as 56, 58, 60, and 62 can be utilized to guide the ribbon through a heating tunnel or zone having suitable heating lamps 64 capable of evaporating the solvent in the hydrophobic coating or impregnating solution. Upon drying the coatting sufficiently so that it is no longer "tacky," it can be formed into a hollow cylindrical element on a suitable ribbon winding machine. On this machine the ribbon is wound edgewise onto a mandrel 66, the outer diameter of which is substantially the same as the desired inside diameter of the cylindrical ribbon wound element. The adjacent layers of the element are bonded together by subjecting the element to heat during the winding operations.

It should be understood that the ribbon strips are formed of hygroscopic material and that the hydrophobic solution is always applied to the portion of the ribbon strip which will form the upstream side of the porous element 30. Thus, in the embodiment shown in FIGURES 1–3, wherein flow is from outside the element to inside thereof, the hydrophobic portion of the ribbon material would be adjacent the outer diameter of the tubular member 30. If, on the other hand flow through the tubular member is from the inside thereof to the outside thereof, then the hydrophobic portion of the ribbon material should be adjacent the inner diameter of the tubular member 30. In the event that it is desired to have a universal element, that is, an element which can be used either for outside-in or inside-out flow, then the coating or impregnation can be applied, as shown in FIGURE 7, to both edge portions of the ribbon strip, so long as the center portion of the ribbon is left uncoated and retains its hygroscopic characteristics. Thus, in all embodiments the hygroscopic portion of the ribbon is always downstream of a hydrophobic portion of the ribbon.

Referring to FIGURES 1 and 2 it will be noted that, as previously described, the porous water separator and fuel monitoring element 24 is mounted on a plate 68 downstream of the coalescer elements 22. One end of the tubular member 30 is closed by the endplate 36 whereas the other end thereof is open and communicates with outlet chamber 20 via the outlet in ferrule 40 so that all fuel must pass through the pores of the layered edge-type tubular member. With this arrangement, any water droplets which are larger than the pore size of the tubular member 30 are retained at the outer hydrophobic surface thereof where the droplets will combine with others, grow in size and roll off the element into the filter housing sump. It will be understood that the perforations in the housig 32 are sufficiently large and of a sufficient number so as not to impede the water separation function of the element.

Any breakdown of one of the coalescer-elements 22 would, in effect, permit a fuel water emulsion to pass through the inoperative coalescer element. The water droplets of such an emulsion are usually submicronic in size and would pass through the pores of any conventional separator element. However, if such a coalescer element failure occurs, upstream of a porous water separator and fuel monitoring element 24, of the type described herein, then the hydgroscopic portion (untreated or uncoated portion) of the porous tubular member 30 will be wetted, or in other words, will absorb the water in the fuel. The subsequent swelling of the hygroscopic fibers will fill the voids between the normally open crepe lines of the ribbon and will cause a rapid increase in restriction through the element. This, in turn, will increase the end loading of the element thereby causing further compression and restriction until further flow through the element is stopped.

A similar porous tubular member 30 could be fabricated out of washer type elements 142 which have the upstream portions thereof suitably impregnated or coated with a hydrophobic substance. A method of coating such washers is described in my Patent No. 2,375,246. In FIGURE 8a a suitable hygroscopic washer is shown impregnated with a hydrophobic substance at the outer diameter portion 144 for an outside-in flow element. In FIGURE 9, the washer is rendered hydrophobic at the inner diameter portion 144 for an inside-out flow element. In FIGURE 10, the washer is rendered hydrophobic at both inner and outer diameter portions for use as a universal element. In each instance the washers can be punched and impregnated as shown, and then stacked in registered face-to-face contact. The stacked washers are then subjected to heat to obtain adhesion of adjacent washers so as to form a unitary combination separator-fuel monitoring element. In the event that the washer type unit is used for inside-out flow, it must be restrained from separation by a rigid support, or other means, rather than a spring-like support.

The foregoing described elements 24 are also usable as water detectors only, particularly for gasoline dispensing pumps and similar applications. In such installations they have the advantage of low initial cost and can be mounted in spin-on type filter housings presently on some commercial gas pumps.

Those acquainted with this art will readily understand that the invention set forth herein is not necessarily limited and restricted to the precise and exact details presented and that various additional changes and modifications may be resorted to without departing from the spirit of my invention. For example, although the unitary element 30 is shown encased within a perforated tube 32, it will be understood that the tube could be eliminated and the unitary element could be sutiably mounted by means of a plate or stud. Accordingly, I do not desire to be limited to the specific details described herein primarily for purposes of illustration, but instead desire protection falling within the scope of the appended claims.

Having thus described the various features of the invention, what I claim as new and desire to secure by Letters Patent is:

1. In a fuel filter water separator device a porous water separator and fuel monitoring element for permitting flow of fuel therethrough but preventing flow of water therethrough comprising registered face-to-face contacting layers of an uneven surface material which form a unitary tubular member having substantially radial pores extending between said layers for permitting flow of fuel therethrough, said layers having a radially extending hydrophobic upstream portion for preventing water droplets from flowing through said pores and a radially extending hygroscopic downstream portion for absorbing any water which passes through said hydrophobic upstream portion and comes in contact therewith, said hygroscopic portion being capable of swelling upon contact with water and closing off said pores to thereby prevent further flow therethrough.

2. A porous water separator and fuel monitoring element, as defined is claim 1, wherein said layers are comprised of a plurality of axially aligned convolutions of ribbon material in registered face-to-face contact.

3. A porous water separator and fuel monitoring element, as defined in claim 1, wherein said layers are comprised of a plurality of washer-like elements in registered face-to-face contact.

4. A porous water separator and fuel monitoring element, as defined in claim 1, wherein the hydrophobic portion of said layers forms the outer surface of said tubular member and the hygroscopic portion of said layers forms the outer surface of said tubular member.

5. A porous water separator and fuel monitoring element, as defined in claim 1, wherein the hydrophobic portion of said layers forms the inner surface of said tubular member and the hygroscopic portion of said layers forms the outer surface of said tubular member.

6. A porous water separator and fuel monitoring element, as defined in claim 1, wherein the hydrophobic portion of said layers forms the outer and inner surfaces of said tubular member and the hygroscopic portion of said layers is located therebetween.

7. A fuel filter water separator device comprising a housing having first, second, and third chambers located therein, an inlet port communicating with said first chamber and an outlet port communicating with said third chamber, a plurality of coalescer elements interposed between said first and second chambers for trapping solid contaminants present in the fuel flowing therethrough from said first to said second chamber and for coalescing any water located in the fuel into relatively large droplets, and a plurality of unitary porous separator elements interposed between said second and third chambers for preventing flow of said coalesced water droplets there through and for absorbing any non-coalesced water passing therethrough, said last mentioned porous elements each being sufficiently sensitive to predetermined levels of water contaminants flowing therethrough to cause closure of the pores therein and prevent flow of water-contaminated fuel therethrough, said separator elements each being a unitary tubular member formed of a plurality of registered face-to-face contacting layers of an uneven surface material having substantially radial pores extending between said layers for permitting flow of fuel therethrough, said layers having a radially extending upstream portion which is hydrophobic for preventing water droplets from flowing through said pores and a radially extending downstream portion which is hygroscopic for absorbing water which has passed through said hydrophobic upstream portion.

References Cited

UNITED STATES PATENTS

| | | | |
|---|---|---|---|
| 2,375,246 | 5/1945 | Kasten | 210—488 |
| 2,421,704 | 6/1947 | Kasten | 210—497.1 |
| 3,034,656 | 5/1962 | Kasten | 210—96 X |
| 3,189,182 | 6/1965 | Kasten | 210—497.1 X |
| 3,223,240 | 12/1965 | Muller | 210—96 |

REUBEN FRIEDMAN, Primary Examiner

J. ADEE, Assistant Examiner

U.S. Cl. X.R.

210—488, 494, 497